April 5, 1932.  E. C. LAWSON  1,852,084
TEAKETTLE
Filed Sept. 9, 1930
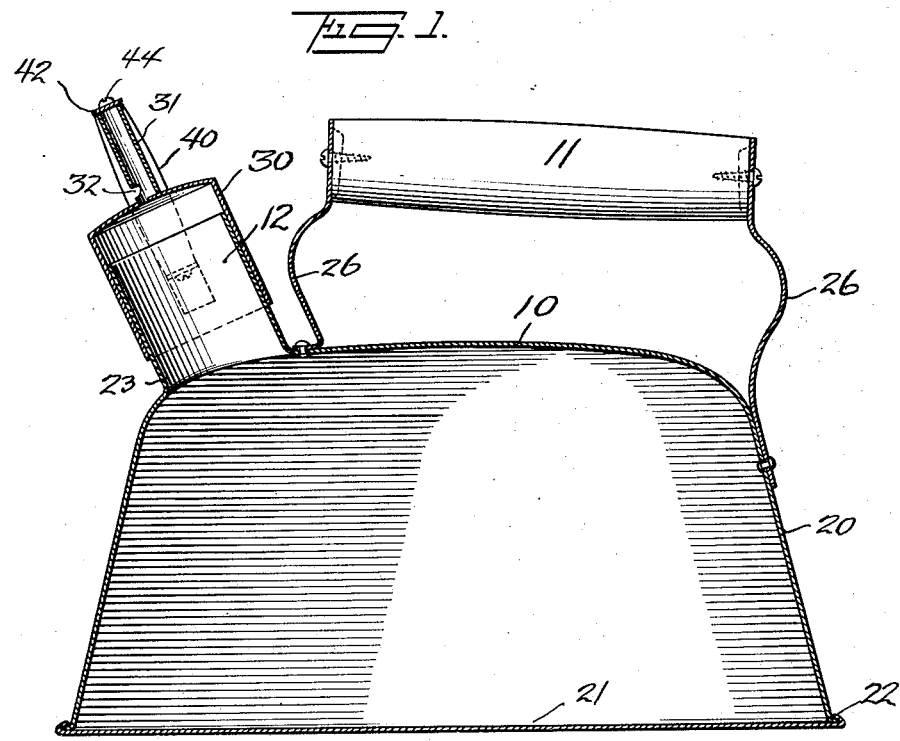
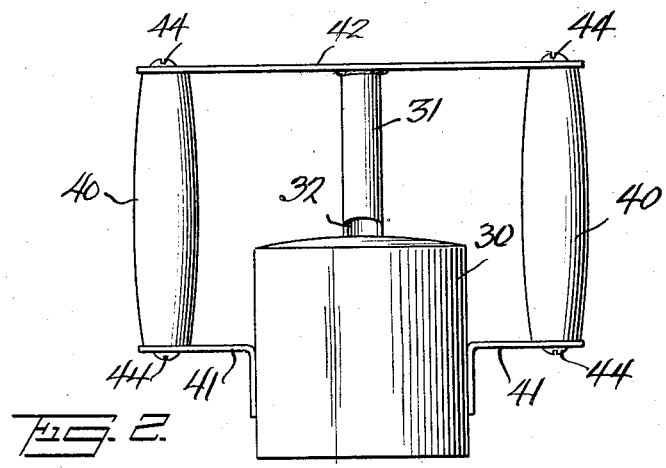
INVENTOR
Edith Carla Lawson
BY
ATTORNEY Patented Apr. 5, 1932

1,852,084

UNITED STATES PATENT OFFICE

EDITH CARLA LAWSON, OF GENEVA, NEW YORK

TEAKETTLE

Application filed September 9, 1930. Serial No. 480,664.

My invention relates to tea kettles, especially to that type used for the boiling of water preparatory to the making of tea and has for its object to produce one which will notify the user that the water has boiled and to provide means for the convenient handling of the kettle without fear of the hands coming in contact with the hot metal of the kettle or the steam emitting therefrom while used.

A further object is to so form my kettle that it will be easily and economically manufactured in production.

The foregoing and other features of my invention will now be described in connection with the accompanying drawings forming part of this specification in which I have represented my kettle in its preferred form after which I shall point out in the claim those features which I believe to be new and of my own invention.

Referring to the accompanying one sheet of drawings in which similar characters of reference indicate like parts throughout the several views:

Figure 1 is a longitudinal section through my kettle.

Figure 2 is a view of my cap used on the single opening taken at right angles to that shown in Figure 1.

In carrying out my invention I employ a kettle 10 provided with a handle 11 and a single opening 12. This opening is used for both filling and/or pouring. The preferred embodiment of my kettle has a single piece domed top 20 rimmed to a bottom 21 at 22 in a circular rim. The single opening is formed by drawing up a neck 23. The handle 11 is preferably rigidly secured by supports 26 to the kettle as shown in Figure 1.

Adapted to telescope with the neck 23, closing the opening 12, I provide a cap 30. Concentric with this cap, a pipe 31 is mounted in which is formed a whistle 32 through which steam will pass and operate. On each side of the cap is mounted a handle 40 preferably of a material that has no heat transferring qualities. In my preferred form the mounting of the handles 40 will consist of substantial brackets 41 mounted on the cap on opposite sides and a cross piece 42 mounted on the pipe 31, the handles 40 being secured at each end by screws 44 to the crosspiece 42 and the brackets 41.

It will be readily unterstood that this form provides a kettle that can be operated by either the right or left hand. When the kettle handle 11 is grasped in the right hand the cap handle 40 on the left side is ready for the left hand and vice versa. Also with the handles in this position there is no danger of the hands coming in contact with the escaping steam.

I wish it distinctly understood that my tea kettle herein illustrated and described is in the form in which I desire to construct it and that changes or variations may be made without departing from the salient features of my invention and I therefore intend the following claim to cover such modifications as naturally fall within the lines of invention.

I claim:

A kettle of the class described comprising a receptacle formed of a single piece dome top and a bottom rimmed thereto, an eccentric opening in the top provided with a neck formed integral therewith, a handle rigidly secured to the top, a cap adapted to telescopically fit on the neck, and provided with a concentrically mounted whistle and two handles of non-heat conducting material diametrically opposite each other secured to the top and the whistle.

In testimony whereof I affix my signature.

EDITH CARLA LAWSON.